(12) United States Patent
Hickie (10) Patent No.: US 9,077,950 B2
(45) Date of Patent: Jul. 7, 2015

(54) SYSTEM, METHOD, AND MODULE FOR A CONTENT CONTROL LAYER FOR AN OPTICAL IMAGING DEVICE

(76) Inventor: Thomas William Hickie, Ottawa (CA)

(*) Notice: Subject to any disclaimer, the term of this patent is extended or adjusted under 35 U.S.C. 154(b) by 0 days.

(21) Appl. No.: 13/096,229

(22) Filed: Apr. 28, 2011

(65) Prior Publication Data

US 2011/0267497 A1 Nov. 3, 2011

Related U.S. Application Data

(60) Provisional application No. 61/328,877, filed on Apr. 28, 2010.

(51) Int. Cl.
*H04N 5/228* (2006.01)
*H04N 5/77* (2006.01)
*H04N 5/907* (2006.01)

(52) U.S. Cl.
CPC .............. *H04N 5/772* (2013.01); *H04N 5/907* (2013.01)

(58) Field of Classification Search
None
See application file for complete search history.

(56) References Cited

U.S. PATENT DOCUMENTS

| | | | | |
|---|---|---|---|---|
| 6,067,399 | A * | 5/2000 | Berger | 386/280 |
| 2003/0014444 | A1* | 1/2003 | Wu | 707/515 |
| 2004/0001149 | A1* | 1/2004 | Smith | 348/218.1 |
| 2005/0286883 | A1* | 12/2005 | Abe et al. | 396/266 |
| 2007/0116328 | A1* | 5/2007 | Sablak et al. | 382/103 |
| 2007/0216775 | A1* | 9/2007 | Yokota et al. | 348/222.1 |
| 2008/0012935 | A1* | 1/2008 | Echtenkamp | 348/14.02 |
| 2008/0088857 | A1* | 4/2008 | Zimmer et al. | 358/1.6 |
| 2009/0002506 | A1* | 1/2009 | Koda | 348/220.1 |
| 2009/0262987 | A1* | 10/2009 | Ioffe et al. | 382/118 |
| 2009/0290035 | A1* | 11/2009 | Hosoda | 348/220.1 |
| 2010/0118169 | A1* | 5/2010 | Yu et al. | 348/294 |
| 2010/0182447 | A1* | 7/2010 | Namba et al. | 348/222.1 |
| 2010/0215268 | A1* | 8/2010 | Park | 382/170 |
| 2011/0047388 | A1* | 2/2011 | Park et al. | 713/189 |
| 2011/0134275 | A1* | 6/2011 | Nguyen | 348/223.1 |
| 2011/0150328 | A1* | 6/2011 | Han et al. | 382/165 |

FOREIGN PATENT DOCUMENTS

JP 2005045600 A * 2/2005 ............. H04N 5/225

OTHER PUBLICATIONS

Translation of JP 2005-045600A, Author: Hibino, Kenichi, Date: Feb. 17, 2005.*
Deng, J. D., "Feature Analysis for Object and Scene Categorization", Chapter 10 in Innovations in Intelligent Image Analysis, Studies in Computational Intelligence vol. 339, 2011, pp. 225-244.

* cited by examiner

*Primary Examiner* — Twyler Haskins
*Assistant Examiner* — Wesley J Chiu
(74) *Attorney, Agent, or Firm* — de Wilton Intellectual Property Inc.; Angela C. de Wilton (57) ABSTRACT

A system, method and content filtering module is provided for analyzing image data received from an imaging sensor, such as a CCD camera, determining whether or not image data meets appropriate criteria, and potentially blocking unacceptable image data, before the data is stored in a device memory or on some other storage medium, or passed to other applications. This system encourages safer and more responsible use of electronic imaging devices without compromising the general utility of said devices. In particular, it may help to protect young people from making and distributing nude, or sexually suggestive pictures, or pictures containing content that is deemed inappropriate, when using a PDA, camera phone, or computer equipped with a camera.

18 Claims, 6 Drawing Sheets

SYSTEM, METHOD, AND MODULE FOR A CONTENT CONTROL LAYER FOR AN OPTICAL IMAGING DEVICE

CROSS-REFERENCE TO RELATED APPLICATIONS

This application is related to and claims priority from U.S. Provisional patent application No. 61/328,877 filed Apr. 28, 2010, the entire contents of which are incorporated herein by reference.

TECHNICAL FIELD

This invention relates to managing the acquisition of images from a digital camera and the storage and the transmission of said images and is particularly applicable to the digital cameras contained in mobile devices such as cellular telephones.

BACKGROUND

Parents and educators often wish to provide young people with electronic devices, such as laptops, portable music players, or mobile phones, for entertainment, educational, convenience, and safety reasons. Very often these electronic devices contain digital cameras, and, in many cases, provide a way to transfer captured images to an electronic storage medium as well as communicate with other devices wirelessly.

While it may be desirable for people under the age of majority to possess these devices, there are currently no controls in place which can prevent the digital camera from being used in an inappropriate manner, such as capturing or distributing sexually explicit material.

Some technology already exists to ensure that young people cannot access inappropriate websites while using a personal computer (NetNanny, for example), but these technologies only restrict access to content that has already been archived or published elsewhere.

Figure 1:
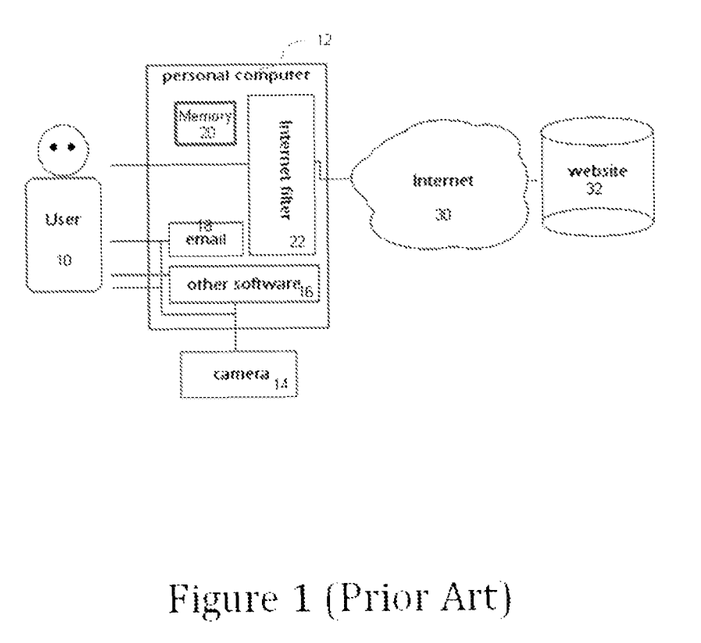
FIG. 1, labeled PRIOR ART, illustrates an existing content filtering system implemented on a mobile electronic device such as a camera phone, PDA or laptop computer.

For example, an existing content filtering system is illustrated in FIG. 1. In such a system, a user 10 of a personal computer 12 has access to the internet 30. The personal computer 12 comprises a camera 14, and can run various software applications 16, which may include internet browsing software and email 18, for example, as is conventional. Data may be retrieved from an archive, such as an Internet website 32, and then stored in memory 20 on the personal computer. A content filtering application 22 running on the personal computer then examines the content in memory, and decides if said content should be made available to the user 10. Content generated from other sources, such as a digital camera 14, are not analyzed by the content filter. Other applications running on the device are still able to access local content sources, such as images generated from the camera, without the use of the content filter. It is important to note that any applications must be made specifically aware of the content filtering system if they are to enforce content restriction.

Known solutions have not addressed the issue of content that is being created by the young person, e.g. content created by a digital camera. Thus, there is a need to restrict users, particularly young people, from using a digital camera to create and/or distribute content, such as sexually explicit images, that may be socially or legally inappropriate.

SUMMARY OF INVENTION

The present invention seeks to mitigate the above-mentioned problem, or at least provide an alternative.

A first aspect of the invention provides an electronic device comprising an imaging sensor for generating image data, processor means, memory means, and a communications interface, and characterized by an image content control layer between the imaging sensor and the memory means and/or communications interface for filtering image data before storage or further processing by the device.

In other aspects, a system and a method for content filtering, and a content filtering module are provided, that analyze data captured from an imaging sensor attached or embedded in an electronic device, such as mobile phone or personal computer, and based on the content of the data can block or prevent the data from being accessed or used by other parts of the electronic device.

In particular, one aspect provides a content filtering system for an electronic device comprising an imaging sensor for generating image data, processor means, memory means, and a communications interface, the system comprising: a content filtering module for receiving input image data captured from the imaging sensor, and comprising means for analyzing said image data and determining whether image data contains image data indicative of inappropriate content, and means for filtering output image data dependent on image content, before passing said output image data for further processing by the electronic device.

Preferably, the means for analyzing comprises an object and scene analysis module. The means for filtering comprises means for blocking output of image data determined to comprise data indicative of inappropriate content, and allowing output of other image data for storing in memory or for further processing by other programs and applications running on an electronic device. Preferably, the content filtering module is disposed between the imaging sensor and all other software and hardware applications on the electronic device in such a way as to ensure that the software and hardware applications on the electronic device are not able to access unfiltered image data from the imaging sensor. For example, the content filtering module comprises an image analysis layer of the operating system of the device, a layer between the device driver of the imaging system and other software and hardware applications on the device, or part of the device driver of the imaging system.

The system has applications for content filtering of locally created image data from electronic devices with an imaging sensor, such as a camera phone, or other devices such as a personal computer, a laptop computer, a netbook, a cellular telephone, a smartphone, a PDA and other mobile communications devices comprising an imaging sensor.

Another aspect of the invention provides a method for content filtering of image data comprising: receiving, directly from an imaging sensor, image data captured by the imaging sensor; and before storing or passing image data for further processing, analyzing said image data for image content; determining whether or not the image data contains inappropriate content; blocking image data which contains inappropriate content and then storing, or passing for further processing other image data.

The steps of analyzing and determining are performed before storing an image in device memory or providing access to the image data by other programs and applications, and may comprise analyzing said image data by performing an object and scene analysis. For example, performing an object and scene analysis and determining whether objects and scenes comprise inappropriate content, such as detecting image data indicative of nudity and/or sexually inappropriate content. Beneficially, applications running on the device are able to benefit from the content filtering module without said applications having to be explicitly aware of the content filtering module.

A further aspect of the invention provides a content filtering module for an electronic device comprising an imaging sensor comprising: means for receiving input image data captured from the imaging sensor, means for analyzing said input image data and determining whether image data contains image data indicative of inappropriate content, and means for filtering output image data dependent on image content, before passing said output image data for storage or further processing by the electronic device.

Thus, preferably, a system comprising a content filtering module is provided that can prevent data acquired from the imaging sensor, such as a CCD camera, from being stored in the devices memory or other storage medium, and prevent the data from being accessed by other applications on the device such as SMS, MMS, Bluetooth, or Email so that the image cannot be transmitted or saved to the devices internal or external memory such as an SD card.

In preferred embodiments of this aspect of the invention, data acquired from the imaging sensor is first passed through the content filtering module. The content filtering module analyzes the image data and decides if the data contains inappropriate content, for example, by using scene and object analysis. If the data does not contain inappropriate content then the data is made available to the device in the same manner as if the content filtering module were not present. If the content filtering module determines that the data contains inappropriate content, then the data is blocked and not made available to the device in such a way as to ensure that the data cannot be archived or transmitted by the device or accessed by other software running on the device.

Thus, the method provides for implementing a decision making process for the control of inappropriate content that ensures other software and/or hardware present on the device cannot access inappropriate content that has been captured by the digital imaging sensor in such a way that other software and hardware applications on the device need not be explicitly aware of said decision making process.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

DESCRIPTION OF PREFERRED EMBODIMENTS

Figure 2:
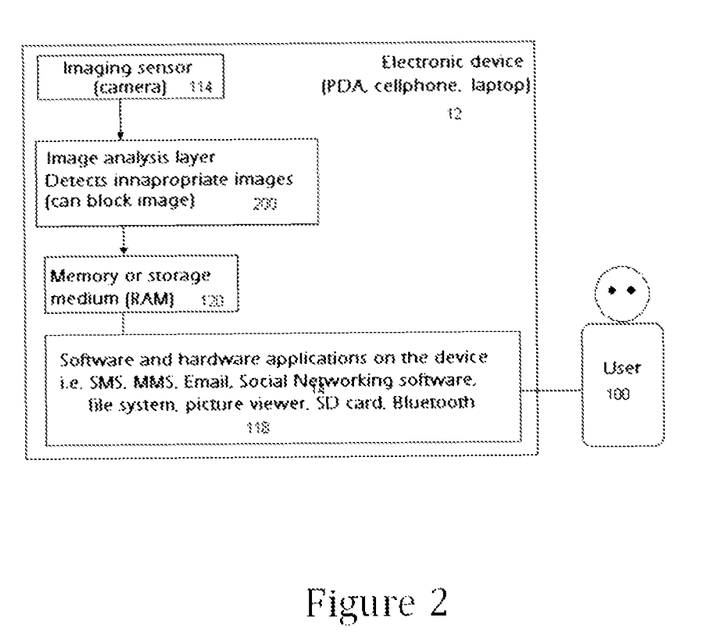
FIG. 2 illustrates a system according to a first embodiment of the present invention.

FIG. 2 illustrates a system according to a preferred embodiment of the present invention, which comprises an electronic device 112 such as a PDA, smartphone or laptop computer, having an imaging sensor, e.g. CCD camera 114, and comprising a memory or storage medium such as RAM 120 and software and hardware applications 118, as is conventional. In addition, an image content filter module 200 is coupled between the output of the image sensor and the memory or storage 120. User 100 may capture image data using the camera 114; however, image data from the digital imaging device 114 is analyzed by the content filter module 200 before it is stored in memory 120 or made accessible to the rest of the device 112 for further processing. The content filtering module 200, comprising an image analysis layer, between the imaging sensor 114 and the memory 120, analyzes image data and implements a decision making process to determine whether or not the image data is acceptable, e.g. relative to specific image content or filtering criteria. Only if the data passes and is deemed acceptable by the content filtering module 200 will it then be stored and become made available to other applications and systems on the electronic device 112.

Figure 3:
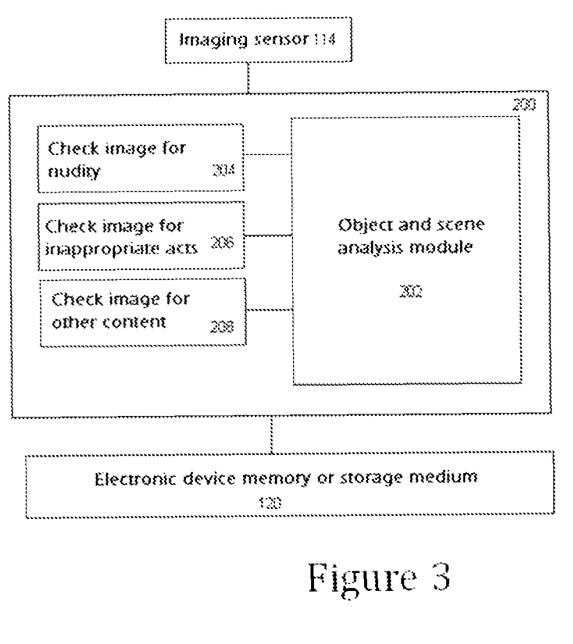
FIG. 3 illustrates elements of the system of the first embodiment comprising the content filtering module.
Figure 4:
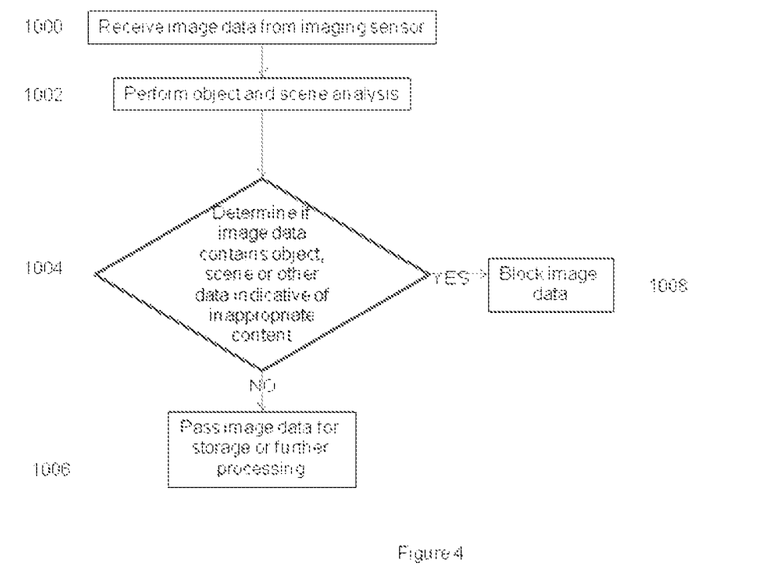
FIG. 4 illustrates a method according to the first embodiment of the present invention.

FIG. 3 illustrates how image data from a digital imaging device 114 may be analyzed by the content filtering 200 before being stored in memory 120 and made accessible to the rest of the device, by method steps illustrated in FIG. 4. The content filtering module 200 receives data from the imaging sensor 114 (step 1000), analyzes image data for content (step 1002) and determines (step 1004) based on the image content criteria, whether image data should be blocked (1008) or stored (1006) and made available for further processing. For example the content filtering module 200 may comprise an object and scene analysis module 202 that implements a method to analyze image data to check for image data indicative of specific objects or scenes, such as implementing checks for nudity 204, inappropriate acts 206 or other specific inappropriate content 208, that should be blocked. Only if the image data passes and is deemed acceptable by the content filtering module will it then become made available to other applications and systems on the electronic device. Otherwise the image data will be blocked from storage.

In this way any data acquired from an imaging sensor are passed through the content filtering module. The content filtering module 200, employing object recognition and scene analysis technology, determines if the data contains inappropriate content such as nudity or depictions of a sexually suggestive or inappropriate nature such as: an image taken from the underside of a dress or skirt, images of sexual acts, or images containing full or partial nudity. The data will only be made available to the device memory 120 and the applications 118 running on the device if it has been determined that the data does not contain inappropriate content.

Figure 5:
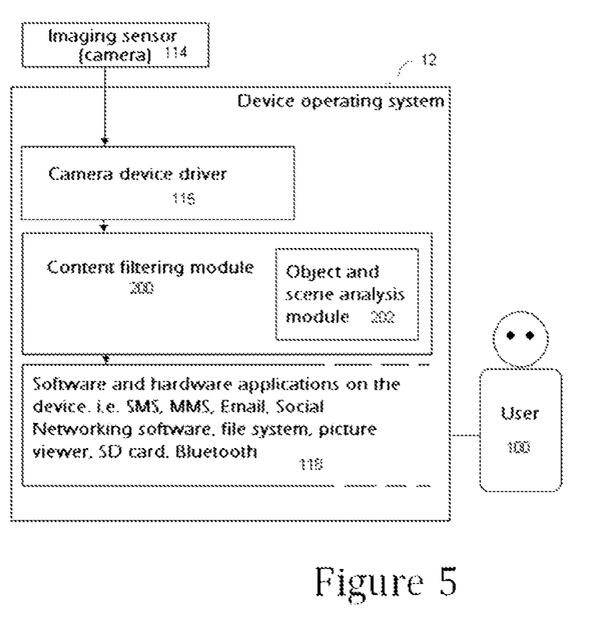
FIG. 5 illustrates a system according to a second embodiment of the invention.

FIG. 5 illustrates a system according to an alternative embodiment of the invention, in which the content filtering module 200 is not built in to the device operating system or the device hardware. In this embodiment, the content filtering module 200 sits between the device driver 115, i.e. a software module provided by the imaging sensor manufacturer that lets a computer operating system communicate with the imaging sensor 114 hardware, and the other applications running on electronic device 112. In this way, data acquired by the imaging sensor 114 is first received by the device driver module 115, and then sent to the content filtering module 200 before being made available to other applications 300 on the device 112. The device driver 115, or the operating system 117, would need to be aware of the content filtering module 200, which comprises an object and scene analysis module as described above, but other applications running on the device would not need explicit knowledge of the content filter.

In this embodiment, data from a digital imaging device is passed by the device driver 115 to the content filtering module and analyzed by the content filtering module before it is made accessible to the rest of the device. Only if the data passes and is deemed acceptable by the content filtering module will it then become made available to other applications and systems on the electronic device.

Figure 6:
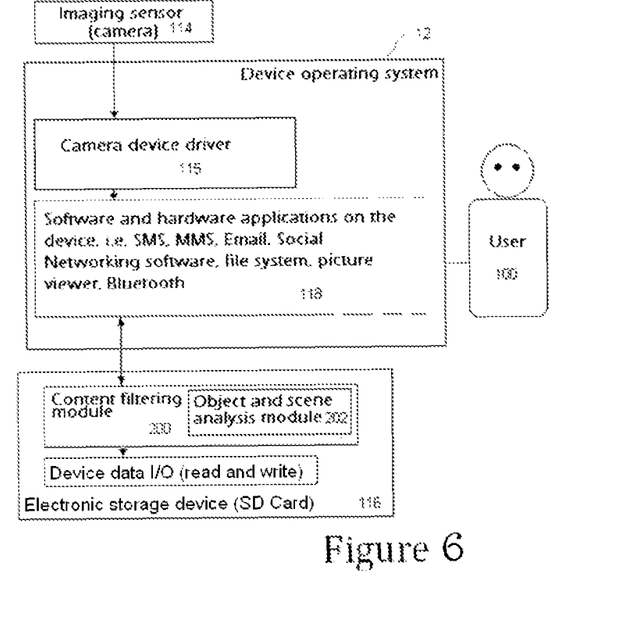
FIG. 6 illustrates a system according to a third embodiment of the invention.

FIG. 6 illustrates a system according to an alternative embodiment of the invention, in which the content filtering module 200 is built in to, or located on, the electronic storage medium 116 used by the device operating system and/or hardware to store electronic data such as images acquired by the optical sensor. In this embodiment, the content filtering module sits between or on a storage medium 116, i.e. non-volatile memory, an SD Card, or a MicroSD Card, and other applications such as the device operating system 117. In this way, data sent to the electronic storage medium for archiving is analyzed by the content filtering module and analyzed by the content filtering module before it is stored, i.e. written on the electronic storage media 116. Only if the data passes and is deemed acceptable by the content filtering module will it then be stored on the electronic storage medium 116 so that other applications, including those not residing on the device, can access said data by way of accessing the electronic storage device.

Thus, even for devices without "safe" camera hardware as described above, a content filtering module built in to the storage medium provides an alternative approach to allow image analysis and filtering which would be able to prevent an image being saved to a fixed or removable storage medium Embodiments of the content filtering layer or module may be implemented in hardware and/or software. When implementing systems and methods as described above on smaller devices, e.g. on a mobile phone, with limited processing power/battery life, hardware implementation may be preferred. That is, to provide increased processing speed, vendors may create hardware specifically for the task of implementing content filtering as described above.

INDUSTRIAL APPLICABILITY

A benefit of this system is that it will provide a standardized safety mechanism for users of electronic devices. Manufacturers of imaging sensors, device hardware, storage media, and manufacturers of device operating systems will be able to offer this content filtering system for protection to the users of their products without requiring independent vendors to implement their own content filtering systems. Vendors will be able to offer a solution for safer use of their products. Parents and educators will be able to provide young people with a variety of electronic devices with more confidence that the safety and well-being of the young people will not be compromised.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. An electronic device comprising:
    an imaging sensor for generating image data containing image content newly created by a user of the electronic device, a processor, a data storage medium, a communications interface, and an image content control layer;
    the image content control layer being interposed between the imaging sensor and both the data storage medium and the communications interface, to receive said image data from the imaging sensor;
    the image content control layer comprising an object and scene analysis module storing instructions, executable by the processor, for analyzing and filtering said image data containing newly created content received from the imaging sensor, said instructions comprising image content criteria defining objects and scenes comprising sexually inappropriate content, said image content criteria being universally applicable for filtering any image data received from the imaging sensor;
    the image content control layer being configured for analyzing and filtering all image data received from the imaging sensor based on said image content criteria before storing and before passing said image data for further processing, by intercepting image data before rendering of the newly created content as viewable, displayable, transmittable and otherwise accessible by the user or others;
    wherein analyzing comprises performing object recognition and scene analysis, and detecting, based on said stored image content criteria, whether or not objects or scenes of the image data contain sexually inappropriate content; and
    wherein filtering comprises blocking storage, transmission and further processing of the entire image data when it contains sexually inappropriate content, and otherwise passing the entire image data to the data storage medium or communications interface for any one of storing, transmitting, and further processing of the image data by the electronic device.

2. The electronic device according to claim 1 wherein the image content control layer storing said instructions comprises one of: a hardware module; a software module embodied in a non-transitory computer readable storage medium; and a combination thereof.

3. A content filtering system for an electronic device comprising an imaging sensor for generating image data containing image content newly created by a user of the electronic device, a processor, a data storage medium, and a communications interface, the system comprising:
    a content filtering module, interposed between the imaging sensor and both the data storage medium and the communications interface, to receive input image data captured from the imaging sensor and for outputting filtered image data to at least one of the data storage medium and the communications interface;
    the content filtering module comprising an object and scene analysis module storing instructions, for execution by the processor for analyzing and filtering said input image data, said stored instructions comprising image content criteria defining objects and scenes comprising sexually inappropriate content, said image content criteria being universally applicable for filtering any image data received from the imaging sensor,
    the content filtering module being configured for analyzing and filtering input image data received from the imaging sensor before storing and before passing said image data for further processing, by intercepting image data before rendering of the newly created image data as viewable, displayable, transmittable and otherwise accessible by the user or others;
    wherein analyzing comprises performing object recognition and scene analysis, and detecting, based on said stored image content criteria, whether or not objects or scenes of the image data contain sexually inappropriate content; and wherein filtering comprises blocking storage, transmission and further processing of the entire image data when it contains sexually inappropriate content, and otherwise passing said entire image data to the data storage medium or the communications interface for storage, transmission or further processing by the electronic device.

4. A system according to claim 3 wherein the content filtering module blocks output of the entire image data comprising data indicative of sexually inappropriate content, and otherwise allowing output of the entire image data for storing in memory or for further processing by other programs and applications running on the electronic device.

5. A system according to claim 3 wherein the content filtering module is disposed between the imaging sensor and all other software and hardware applications on the electronic device in such a way as to ensure that the software and hardware applications on the electronic device are not able to access unfiltered image data from the imaging sensor.

6. A system according to claim 3 wherein the electronic device comprises an operating system and the content filtering module comprises an image analysis layer of the operating system of the electronic device.

7. A system according to claim 3 wherein the imaging sensor comprises a device driver and the content filtering module comprises a layer between the device driver of the imaging sensor and other software and hardware applications on the electronic device.

8. A system according to claim 3 wherein the imaging sensor comprises a device driver and the content filtering module comprises part of the device driver of the imaging sensor.

9. A system according to claim 3 wherein the content filtering module comprises a part of the data storage medium.

10. A system according to claim 3 wherein the content filtering module provides an interface to the data storage medium.

11. A system according to claim 3 wherein the data storage medium comprises a non-volatile memory.

12. A system according to claim 3 wherein the data storage medium comprises a removable storage device comprising an SD (Secure Digital) Card, or a MicroSD (Micro Secure Digital) Card.

13. A system according to claim 3 wherein the electronic device comprises one of a personal computer, a laptop computer, a netbook, a cellular telephone, a smartphone, a PDA (Personal Digital Assistant) and other mobile personal communications devices comprising an imaging sensor.

14. A method for content filtering of image data in an electronic device comprising an imaging sensor, a data storage medium and a communications interface, the method comprising performing, in a content filtering module interposed between the imaging sensor and the storage medium and the communications interface, the steps of:
   receiving, directly from the imaging sensor, image data comprising newly created image content captured by the imaging sensor;
   based on stored instructions comprising image content criteria defining objects and scenes comprising sexually inappropriate content, said image content criteria being universally applicable for filtering any image data received from the imaging sensor, analyzing and filtering said image data for image content before storing and before passing said image data for further processing, by intercepting image data before rendering of the newly created image data as viewable, displayable, transmittable and otherwise accessible by the user or others;
   said step of analyzing comprising performing object recognition and scene analysis, and detecting, based on said stored image content criteria, whether or not objects or scenes of the image data contains sexually inappropriate content; and
   said step of filtering comprising blocking storage, transmission and further processing of the entire image data when it contains sexually inappropriate content; and otherwise passing the entire image data for storage or further processing.

15. A method according to claim 14 wherein said steps of analyzing and filtering are performed before storing an image in device memory and before providing access to the image data by other programs and applications.

16. A method for content filtering according to claim 14 wherein, said step of analyzing comprises detecting image data comprising objects or scenes indicative of sexual nudity.

17. A method for content filtering according to claim 14 wherein the content filtering module is configured to enable applications running on the device to benefit from the content filtering module without said applications having to be explicitly aware of the content filtering module.

18. A content filtering module for an electronic device comprising an imaging sensor, a processor, a storage medium and a communications interface, comprising:
   an image content control layer interposed between the imaging sensor and said storage medium and communications interface of the electronic device, to receive image data from the imaging sensor,
   said image content control layer comprising hardware and/or software encoded in a non-transitory computer readable storage medium, and said image content control layer storing instructions, for execution in the processor, for analyzing and filtering image data, said instructions comprising image content criteria defining objects and scenes comprising sexually inappropriate content, said image content criteria being universally applicable for filtering any image data received from the imaging sensor, for implementing the method steps of:
   receiving, directly from the imaging sensor, image data captured by the imaging sensor comprising newly created content, intercepting said image data before rendering of the newly created content as viewable, displayable, transmittable or otherwise accessible by the user or others, and analyzing and filtering said image data before storing and before passing said image data for further processing;
   wherein analyzing comprises performing object recognition and scene analysis, and detecting, based on said stored image content criteria, whether or not objects or scenes of the image data contains sexually inappropriate content; and
   wherein filtering comprises blocking storage, transmission and further processing of the entire image data when it contains sexually inappropriate content; and otherwise storing, or passing for further processing, the entire image data.

* * * * *